Sept. 20, 1971 D. R. HERRIOTT 3,605,410
FAIL-SAFE VEHICLE BRAKING SYSTEM WITH INDEPENDENT
FRONT AND REAR SUB-ASSEMBLIES
Filed June 16, 1969 3 Sheets-Sheet 1

INVENTOR
DAVID R. HERRIOTT
BY
ATTORNEYS

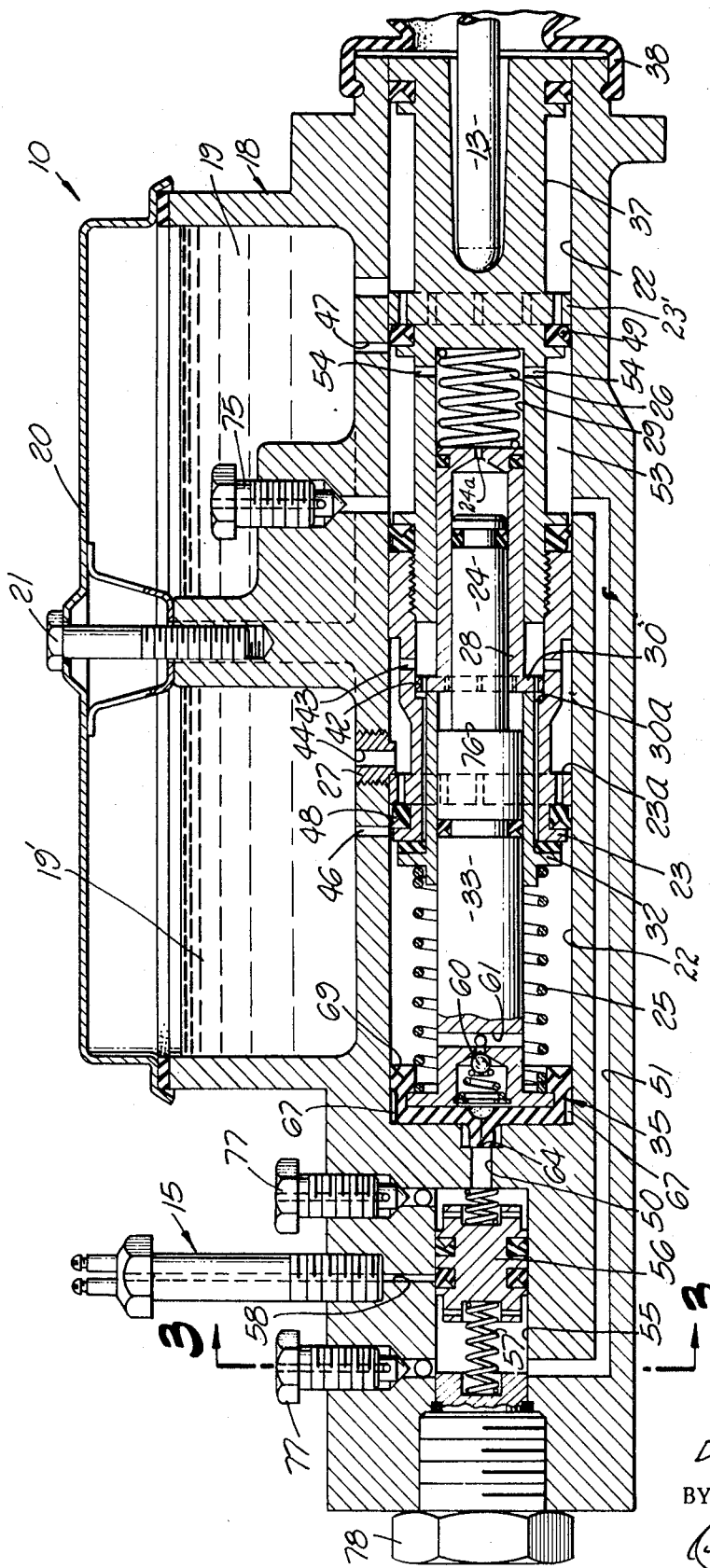

INVENTOR
DAVID R. HERRIOTT

BY

ATTORNEYS

United States Patent Office 3,605,410
Patented Sept. 20, 1971

3,605,410
FAIL-SAFE VEHICLE BRAKING SYSTEM WITH INDEPENDENT FRONT AND REAR SUB-ASSEMBLIES
David R. Herriott, 1403 Verdugo Blvd.,
La Canada, Calif. 91011
Filed June 16, 1969, Ser. No. 833,361
Int. Cl. F15b 7/00
U.S. Cl. 60—54.5E
43 Claims

ABSTRACT OF THE DISCLOSURE

A master cylinder assembly for controlling a hydraulic system, including a vehicle braking system, utilizing a plurality of master pistons of graduated size under the control of a common manually-operated actuator. The normally retracted master pistons cooperate when first actuated to charge the system quickly with fluid under low pressure, following which the larger piston is deactivated as the load is assumed by a smaller one of the pistons effective to continue pressurization of the fluid at a substantially higher ratio of applied force to the output hydraulic pressure.

---

In a preferred application of the invention to the control of vehicle brakes, the front and rear wheel brakes are arranged in separate hydraulic sub-assemblies both of which are normally energized by equalized fluid pressure supplied from a single master cylinder assembly. The pressure equalizer interconnecting the two sub-assemblies is so arranged with respect to the master cylinder assembly as to provide fail-safe operation. If the rear wheel sub-assembly fails, relatively high pressure fluid is automatically supplied to the front wheel brakes, whereas in the event of a failure in the latter, the rear wheel brakes are automatically energizable only with the low pressure fluid. If a failure occurs in either sub-assembly a warning signal is activated to warn the operator of the defect.

This invention relates to master cylinder assemblies, and more particularly to a unique construction of general utility in the control of hydraulic systems and particularly useful in providing a fail-safe vehicle braking system.

Many improvements and advantages of the present invention are readily obtained by virtue of a simplified, versatile, high efficiency master cylinder assembly.

This assembly includes a plurality of master pistons of graduated size arranged for actuation by a common, manually operated actuator. Among the unique features of the arrangement is the fact that all master pistons cooperate initially in charging the system with fluid and in pressurizing this fluid to a moderate degree to provide useful power of moderate magnitude. Further and continued increase in the operating force applied to the actuator serves to deactivate the larger master piston and in the utilization of the smaller diameter master piston means to assume the load and to develop high pressure hydraulic load forces. Accordingly, only a slight or moderate increase in the applied load is required to produce much greater useful hydraulic forces.

One illustrative and preferred use of the master cylinder assembly is to control the operation of a vehicle braking system having the front and rear sets of wheels included in separate hydraulic assemblies each energized normally by equalized fluid pressure provided by the master cylinder assembly. The two brake sub-assemblies include pressure-equalizing means automatically responsive to a failure in either sub-assembly to deactivate only that sub-assembly. More specifically, the fail-safe capabilities of the present invention utilize the pressure equalizing component in combination with pressure-sensing valve mechanism to modify the braking force applied to either braking sub-assembly upon failure of the other sub-assembly. Thus, upon the failure occurring in the rear wheel sub-assembly, effective braking force applied to the front wheel brakes is reduced slightly. On the other hand, if the front sub-assembly experiences a failure, the system substantially reduces the effective braking force applied to the rear wheel braking sub-assembly. Each of these modified braking efforts is highly desirable in the interests of safety and maximum braking effectiveness under the reduced braking capabilities. The front wheels can utilize increased braking fluid pressure with a high degree of safety because these wheels bear the larger portion of the vehicle weight. The rear wheels cannot utilize greater braking fluid pressure because more lightly loaded and because of the vehicle tendency to fish-tail and skid.

Another feature of the invention is the simplicity of design, wherein the master cylinders are supported in axial alignment in a single bore of the main housing with the smaller, higher pressure piston telescoping into a bore formed in the larger diameter piston. The smaller piston remains substantially stationary and the common actuator for the pistons acts directly against the larger piston. All pistons are normally spring-biased to their extended positions and return to these positions as soon as the actuator is released.

Another feature of the invention is the provision of monitoring alarm or signal means operatively connected with the pressure-equalizing component and effective to advise the operator should a failure occur or if the brake shoes in any sub-assembly are worn to an unsafe point.

It is therefore a primary object of the present invention to provide a simplified, versatile and superior multiple-stage master cylinder assembly for use in controlling pressure conditions in a hydraulic system.

Another object of the invention is the provision of a multiple-stage master cylinder assembly having a common actuator for all stages.

Another object of the invention is the provision of a master cylinder assembly having a plurality of master pistons supported in a single chamber and cooperating to provide a relatively low level output followed by a relatively high level output in response to a slight variation in the applied operating force.

Another object of the invention is the provision of a master cylinder assembly for use in controlling a hydraulic system utilizing a plurality of master pistons of graduated diameters cooperating initially to charge the system with fluid under low presure and responsive to a slight increase in the applied pressure to materially change the input to output ratio of the assembly.

Another object of the invention is the provision of a vehicle braking system having separate hydraulic sub-assemblies for the front and rear brakes connected to a common multiple stage master cylinder assembly having unique fail-safe operating characteristics.

Another object of the invention is the provision of a vehicle braking system employing independently functioning front and rear braking sub-assemblies adapted to be energized with equal fluid pressure by a master cylinder assembly automatically operable to deactivate either sub-assembly upon failure thereof and to modify the braking effort capabilities of the other sub-assembly.

These and other more specific objects will appear upon reading the following specification and claims and upon consideration in connection therewith the attached drawing to which they relate.

Referring now to the drawing in which a preferred embodiment of the invention is illustrated:

FIG. 2 is a longitudinal vertical sectional view on an enlarged scale of the master cylinder assembly showing the position of the parts when fully relaxed;

Figure 1:
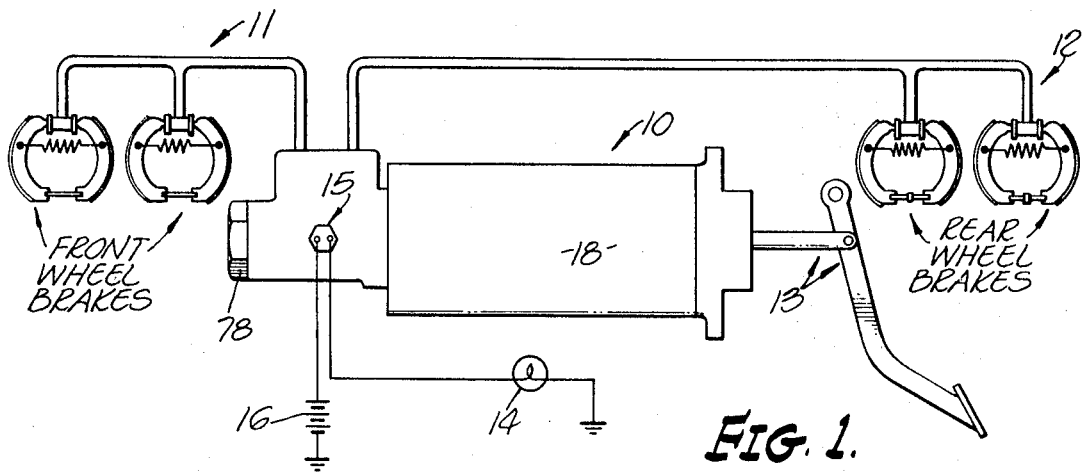
FIG. 1 is a generally schematic view of the invention master cylinder assembly incorporated in a vehicle braking system.

Referring to the drawings and more particularly to FIG. 1, there is shown a preferred embodiment of the invention master cylinder assembly, designated generally 10, employed to control a vehicle braking system having a front wheel braking sub-assembly 11 and a rear wheel braking sub-assembly 12. Master cylinder assembly 10 is suitably controlled as by the foot-operated actuator 13. When the front and rear wheel sub-assemblies 11, 12 are in proper functioning condition indicator lamp 14 is deactivated but, should either of these sub-assemblies fail for any reason, the presure-sensing device 15 senses the inoperative condition and completes a circuit from battery 16 to lamp 14 located in a position readily viewed by the vehicle operator, thereby appraising him of the malfunctioning of the braking system.

Referring now to FIG. 2, the master cylinder assembly will be understod as having a main body casting 18 formed on its upper side with a pair of independent hydraulic fluid reservoirs 19, 19' normally sealed closed by cover plate 20 and a cap screw 21. Underlying reservoirs 19, 19' is a single main bore 22 slidably supporting a relatively large diameter master piston 23 and a much smaller diameter master piston 24. As shown in FIG. 2, master pistons 23, 24 are in their fully retracted position against stop screw 27, being so held by compression springs 25 and 26. Stop screw 27 bears against the rear face of piston 23 from the bottom wall of reservoir 19' and also serves as a fluid supply and transfer port.

Figure 4:
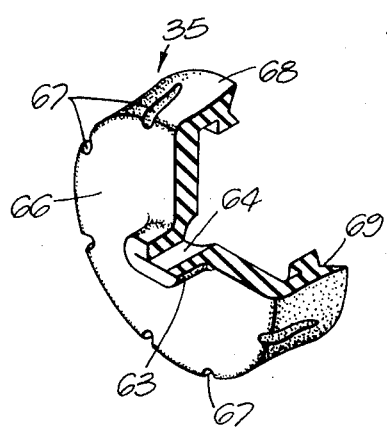
FIG. 4 is a perspective view partly in section of the double check valve constituting a feature of the invention.

Slidably supported on smaller piston 24 is a piston 28 having a close sliding fit with a deep well 29 formed axially of the larger master piston 23. Pistons 24 and 28 cooperate in forming a smaller diameter master piston having a port 24a through the end wall 28. A radial ported flange 30 at the forward end of hollow piston 28 is positioned closely adjacent the rear end of sleeve valve 32 having a close sliding fit with shank 33 of the smaller master piston. Normally sleeve valve 32 is held seated against the forward pressurizing face of master piston 23 by a strong compression spring 25. The other end of this spring bears against the enlarged head at the forward end of shank 33 and holds the special-purpose double-function check valve 35 firmly seated against the forward end of bore 22 housing the master pistons. The details of valve 35 are shown in FIG. 4 and will be described more fully presently.

Returning now to the smaller master piston 24, it will be understood that compression spring 26 has its forward end bearing against the perforated end cap of piston 28 and its rear end bearing against the bottom of well 29. It will therefore be apparent that this spring cooperates with spring 25 in urging the shank 37 of master piston 23 and actuator 13 to their fully retracted positions as shown in FIG. 2. The rear end of bore 22 is preferably sealed closed about the actuator and against the entry of foreign matter by a suitable resilient bellows-like boot 38.

Springs 25 and 26 are so proportioned and arranged that the larger master piston 23 moves forward sufficiently that the brake cylinders are charged, and preferably partially pressurized, before spring 26 and the pressure build-up in well 29 are mutually effective to overpower spring 25. As this occurs, piston 28 moves forwardly until its forward flanged end 30 abuts shoulder 30a (FIG. 2). As flange 30 moves toward shoulder 30a, it shifts sleeve valve 32 forwardly on shank 33 allowing pressurized fluid in the forward end of bore 22 and forward of piston 23 to escape through passage 40 surrounding the exterior of sleeve valve 32. The fluid so escaping is vented directly to the unpressurized fluid reservoir 19' by way of passages 42, 43, 44.

When the components of the master cylinder assembly are fully retracted, as they are in FIG. 2, the pressurizing faces of all master pistons are in communication with fluid reservoirs 19, 19' via the respective compensating ports 46, 47. However, fluid sealing rings 48, 49 carried by the larger master pistons 23, 23' seal off supply ports 46, 47 after very slight actuating movement of the brake pedal, thereby trapping fluid in the closed braking system and permitting it to be pressurized by any further actuating movement of the brake pedal.

Figure 5:
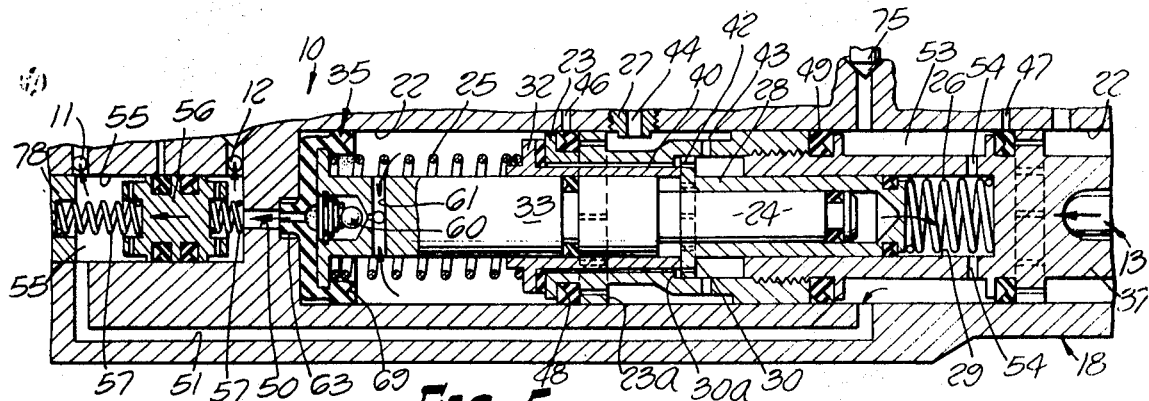
FIG. 5 is a fragmentary longitudinal sectional view through the master cylinder assembly showing the position of the parts as initial pressure is applied to the actuator.

To be noted at this point is the fact that the ported stop screw 27 projects slightly through the inner side wall of bore 22 in position to abut the rear rim edge 23a (FIGS. 2, 5) in its proper fully retracted position. In this position master cylinder assembly 10 is in its most advantageous position to initiate an operating stroke.

The fluid passage means by which pressurized fluid is conveyed from the pressurizing sides of each master piston to conduits leading to the two brake sub-assemblies 11, 12 includes a short passage 50 opening axially into the forward end of chamber 55 and a second passage 51 formed along the lower side of housing 18 and opening into the forward end of chamber 55. The right hand end of passage 51 is in communication with an annular chamber 53 surrounding the shank of master piston 23 and communicates with the inner end of well 29 of the smaller master piston via passages 54.

The forward ends of fluid passages 50, 51 open into the opposite ends of a pressure-equalizing chamber 55 slidably supporting an equalizer piston 56 normally biased to the position shown in FIG. 2 by a pair of coil springs 57, 57 bearing against its opposite ends.

During normal operation of the braking system, equalizer 56 maintains the inlet port 58 to pressure-sensing switch device 15 closed with the result that signal lamp 14 remains de-energized. However, should either sub-assembly fail, or should the brake shoes, as the front shoes, become worn dangerously, pressure-equalizer 56 shifts to a position uncovering port 58 so that pressurized fluid closes the electrical circuit to lamp 14 thereby advising the driver that one of the braking sub-assemblies has failed or has reduced braking capability. Usually the front shoes wear faster than the rear. The relatively greater fluid requirements to seat these worn shoes cause equalizer 56 to shift enough for pressurized fluid to enter port 58 and activate signal light 14, thereby advising the driver of the unsafe brake condition.

The check valve device controlling flow of pressurized fluid and the return of fluid to the larger master piston after relaxation of the rear wheel brakes will now be described. Included in this check valve assembly, located at the forward or inner end of bore 22, is a resilient cup-shaped double check valve unit 35 and a ball check valve 60. As illustrated in FIG. 2, all three check valves are closed. The construction of these three valves will now be described.

The double check valve 35 comprises a unitary soft rubber cup-like element having its exterior bottom wall shaped complementally to the end wall of bore 22 and is assembled over the flanged inner end of shank 33 for the smaller diameter master piston 24. Compression spring 25 seats against this same flange and normally presses the bottom of cup 35 against the end of the bore and provides an effective oil seal therewith.

The central portion of the cup bottom is provided with a forwardly extending flattened tubular boss 63, best shown in FIG. 4, having a normally closed passage 64 therethrough. So long as the fluid pressure in passage 50 is higher than the fluid pressure in the forward end of bore 22, this pressure differential acts to hold the flat sides of boss 63 pressed agianst one another to prevent fluid flow backwardly along passage 64 into bore 22. However, if the pressure differential is in the reverse direction, then fluid from bore 22 passes through passage 61 and lifts backup ball check valve 60 off its seat and allows the fluid to open passage 64 and flow into passage 50 and into pressure equalizing chamber 55.

The second check valve provided by unit 35 will also be best understood from FIG. 4 wherein it will be noted that the thickened rim edges of its side wall include an outwardly flaring feathered lip 68 in light pressure contact with the side wall of bore 22. The edge of the cup rim is provided with a V-shaped groove 69 and aids the proper functioning of the check valve. If the pressure is higher in passage 50 than in bore 22 and no pressure is being exerted by piston 24, then fluid can pass to the right along passage 50 and lift the rubber cup 35 away from the bottom of the bore and along the sides of the cup member via grooves 67 and its exterior side wall and lift lip 68 away from the bore wall so that the fluid can re-enter the bore chamber. If however the pressure in this bore is the same as in passage 50, the fluid pressure acts to press lip 68 against the bore wall and cup unit 35, as a whole, firmly against the end wall of bore 22.

Figure 3:
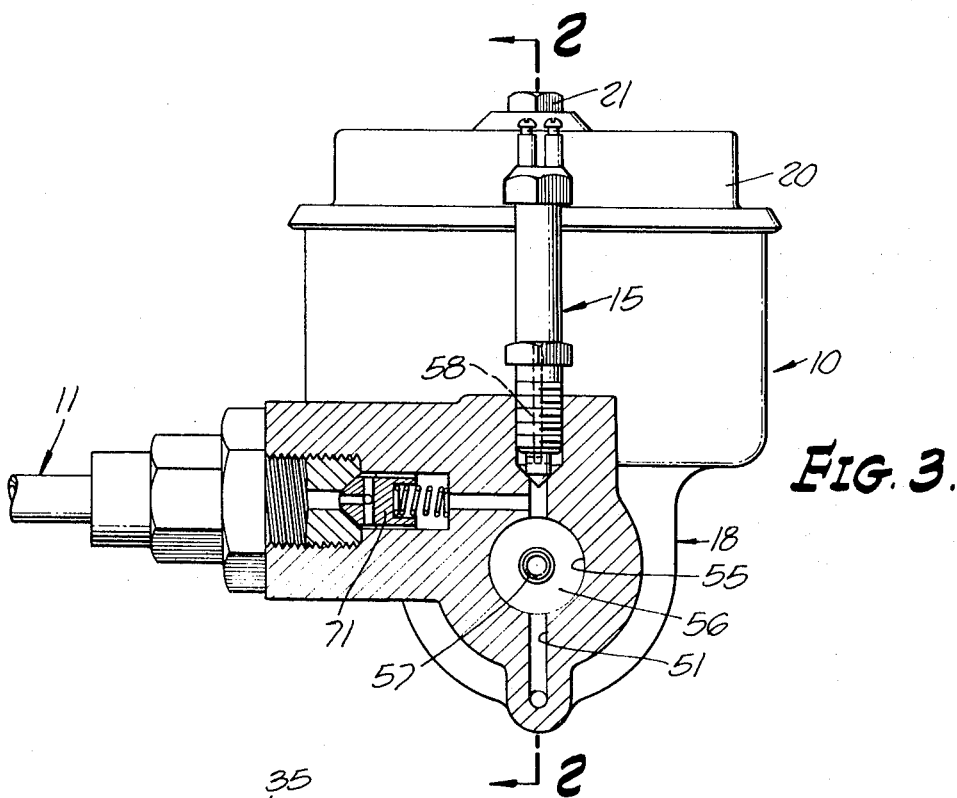
FIG. 3 is a transverse sectional view taken along line 3—3 on FIG. 2.

There remains to be described plugs 75 and 77 normally closed, but loosened during initial charging to release air and permit fluid to enter and fill all parts of the system. The forward end of main housing 18 is also provided with a threaded well opening into pressure equalizing chamber 55 and normally sealed closed by the gasketed cap screw 78. Referring now to FIG. 3, it will be noted that the fluid passages opening from the pressure equalizing chamber 55 into the front and rear braking sub-assemblies 11, 12 are preferably provided with spring pressed flow restrictors 71 constructed and functioning in conventional manner. This restrictor may be omitted for the rear braking sub-assembly 12.

NORMAL OPERATION OF THE MASTER CYLINDER ASSEMBLY AND BRAKING SUB-ASSEMBLIES

When at rest, the parts occupy the positions shown in FIG. 2 and the chambers in bore 22 on the oppositely facing sides of master pistons 23 and 24 are in communication with the fluid reservoirs 19, 19' via passages 46 and 47, respectively. To apply the brake, the operator steps on the foot pedal actuator 13 thereby moving the larger master pistons 23, 23' forwardly. Only slight forward movement is required for the lips of fluid seals 48, 49 to cut off flow between the fluid reservoir along passages 46 and 47 thereby trapping the fluid. Any further forward movement of the master piston by actuators 13 serves initially to expand the brake shoes in each brake sub-assembly 11 and 12. Thus, the pressurization of fluid forwardly of the master piston operates to force fluid past check valve 60, check valve 64, along passage 50 and into the right hand end of pressure equalizing chamber 55. Likewise, as the larger master piston moves forwardly the fluid is trapped between smaller pistons 24, 28 and the inner end of the deep well 29 causing it to flow through passages 54 and along passage 51 into the forward end of equalizing chamber 55. Likewise, fluid entering the right hand end of chamber 55 flows into and loads the rear wheel brake sub-assembly and most of the front brake assembly through action of equalizer piston 56. The pressure in both sub-assemblies 11 and 12 is maintained equal since any inequality is immediately compensated for by the shift of piston 56 in one direction or the other as necessary to maintain balanced pressure conditions.

During the operation just described sleeve valve 32 remains closed against the forward end of master piston 23 with the result that all master pistons cooperate in charging the brake cylinders with fluid and in applying moderate brake pressure. If, however, driving conditions warrant more than a moderate degree of braking, the application of additional force to actuator 13 results in a pressure build up in well 29 and in the compression of spring 26 sufficiently to overpower spring 25. In consequence sleeve piston 28 shifts forwardly along with sleeve valve 32, opening the latter so that the pressurized fluid forwardly of piston 23 bleeds rearwardly and into reservoir 19' along passage 40 exteriorly of sleeve 32 and through passages 42, 43 and 44. Since these flow passages are always under atmospheric pressure, the fluid forwardly of the master piston 23 is now depressurized and the entire braking load is assumed smoothly by the small diameter master piston 24. Under these conditions high pressure braking effort is supplied to both braking sub-assemblies entirely by piston 24 via parts 24a and 54 since sleeve piston 28 is now bottomed out against shoulder 30a. The fluid pressure provided by this piston acts to maintain check valve 35 closed against backward flow of fluid into bore 22. Since no fluid can flow backwardly along passage 50 there is no movement of the equalizer piston 56 and it serves to transmit the high pressure provided by master piston 24 to both brake sub-assemblies.

It will be apparent from the foregoing that the system converts quickly and smoothly from relatively low-ratio to high-ratio braking capability. In other words, once sleeve valve 32 begins to open the master cylinder assembly converts quickly to high pressure operation wherein only slight movement and slightly additional pressure applied to actuator 13 suffices to greatly increase the braking capability of the system.

Upon removing pressure from the actuator 13, springs 25 and 26, together with the fluid pressure exerted by the brake return springs, quickly restore the master pistons and other components to their initial starting condition shown in FIG. 2 as excess braking fluid is transferred back to reservoir 19. The manner in which valve unit 35 shown in FIG. 4 permits return flow of fluid from the rear wheel sub-unit will be readily apparent from the detailed description given previously respecting the valve. Fluid cannot return into bore 22 via the resilient and normally closed port 64, nor via ball valve 60 since both of these remain closed. However, the fluid in the forward end of bore 22 is not under pressure with the result that the pressure applied by the brake relaxing springs for the rear wheel brakes, in concert with pressure equalizer spring 57, acts to pressurize the fluid in sub-assembly 12 sufficiently to lift surface 66 of valve 65 from the bottom of bore 22 allowing the fluid to escape radially across surface 66 and upwardly past lip 68 of valve 35. The conjoint action of these springs, and particularly spring 57 is highly effective in forcing the fluid past dual valve unit 35 back into bore 22, as well as in providing room for fluid from the front wheels to flow back into the forward end of chamber 55. The liquid entering bore 22 from passages 50, 51 flows upwardly through ports 46 and 47 and into reservoirs 19' and 19 respectively.

FAIL-SAFE OPERATION ON PRESSURE FAILURE IN REAR WHEEL SUB-ASSEMBLY

Figure 6:
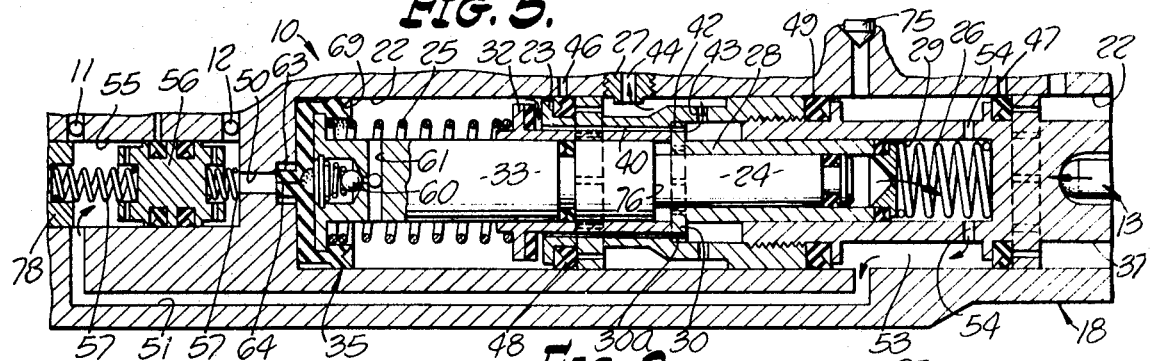
FIG. 6 is a view similar to FIG. 5 but showing the position of the parts as the larger master piston is being deactivated and while both sub-assemblies are being pressurized at equal and higher pressure by the smaller diameter master piston.
Figure 7:
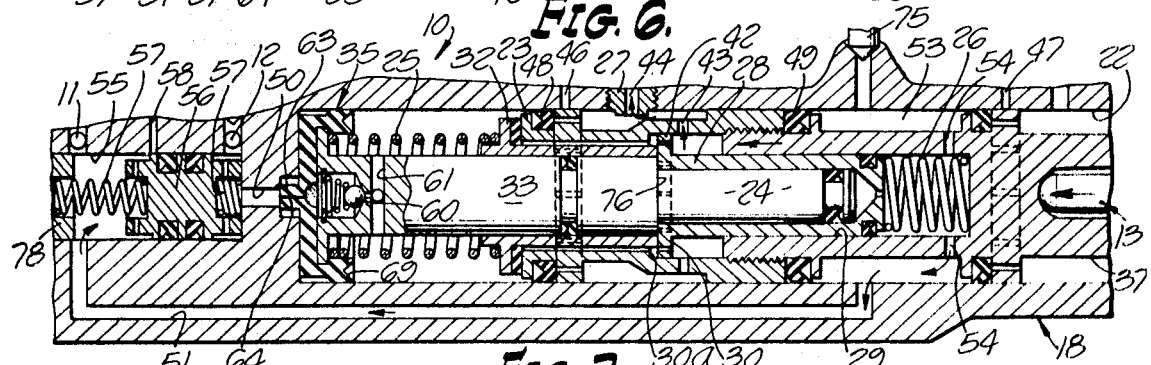
FIG. 7 is a view similar to FIG. 5 but showing fail-safe operation and the position of the parts during application of the front brakes following failure of the rear braking sub-assembly.

The fail-safe operation of the system, assuming a pressure failure in the rear wheel sub-assembly 12, will now be described with the aid of FIG. 7. The general operation of master assembly 10 is the same as described above with the exception that the system goes quickly into medium pressure operation because the rear wheel system is open to the atmosphere and therefore can provide no back pressure. Hence master piston 28 shifts quickly forwardly relative to the smallest piston 24 until the flanged forward end of piston 28 abuts shoulder 76. This condition is clearly shown in FIG. 7. When this occurs, pistons 24 and 28 cooperate with well 29 in supplying fluid under a safe moderate pressure to the front set of brakes thereby avoiding the risk of over-braking these wheels so long as the rear brakes remain unserviceable. Since there is a failure in the rear wheel sub-assembly, the right hand end of equalizing chamber 55 remains unpressurized with the result that pressurized fluid in the left hand end acts to shift equalizer piston 56 fully to the right (FIG. 6) thereby exposing port 58 leading into pressure sensor 15. The high pressure applied to this port acts to close the electrical circuit to lamp 14 providing the driver with a visual signal indicating that one of the braking sub-assemblies only is in operative condition. In the present assumed instance, this unit is front wheel sub-unit 11.

The driver operates the brake pedal and actuator 13 in the usual manner causing the fluid trapped rearward of the combined master pistons 24, 28 to supply medium pressure fluid to passage 51 and to the front wheel sub-assembly 11. Very effective braking is thereby provided to the front wheels. Owing to the fact that the major weight of the vehicle is carried by the front wheels, these wheels can make effective use of strong braking effort. As soon as the pressure is released from actuator 13, the fluid returns to the master cylinder via passage 51 and flows into reservoir 19 via port 47.

FAIL-SAFE OPERATION IN THE EVENT OF FRONT WHEEL BRAKE FAILURE

Should the front wheel sub-assembly 11 fail, then the master cylinder functions automatically to provide low braking pressure to the operative rear wheel sub-assembly 12. Since there is a failure in the front wheel system, the application of pressure via passage 50 to the right hand end of equalizer chamber 55 operates to shift piston 56 until it abuts the front end of this chamber. The slight amount of fluid possibly discharging from the smaller master piston cylinder merely passes along passage 51, along the annular groove at the left hand end of piston 56 and into the now-open conduit of sub-assembly 11. Relatively low pressure fluid is then supplied to the rear wheels from the left hand end of bore 22 pressurized by the larger master piston 23. Since well 29 for the smaller master pistons 28, 29 is now vented to the atmosphere owing to the failed front brakes, it will be evident that fluid in well 29 cannot be pressurized with the result that sleeve valve 32 remains closed. The fluid pressurized by piston 23 passes along passage 61, past check valves 60 and 64, conduit 50, and into the conduit leading to sub-assembly 12. The braking effectiveness is reduced quite sharply, as is desirable to avoid skidding and throwing the vehicle into a tailspin.

ALTERNATE MASTER CYLINDER ASSEMBLY

Figure 8:
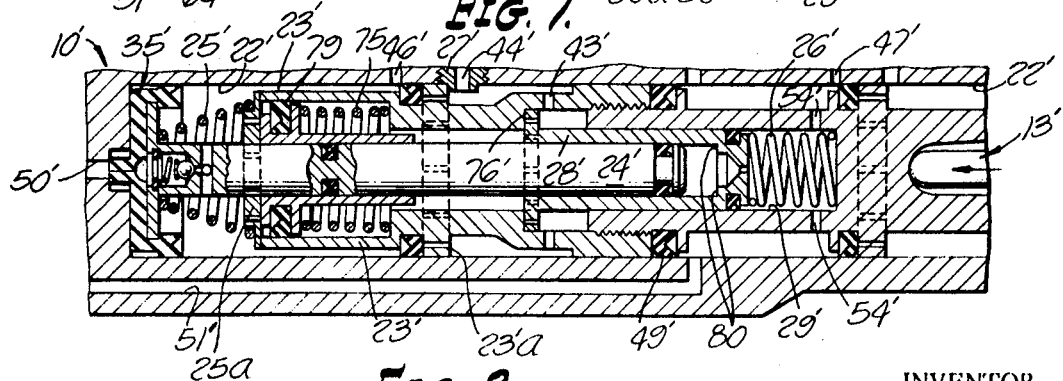
FIG. 8 is a longitudinal cross-sectional view similar to FIG. 5 but showing a modified master cylinder assembly as the actuator begins its actuating movement.

Referring now to FIG. 8, there is shown a slightly modified master cylinder assembly wherein the similar components to those of the preferred form are designated by the same reference characters distinguished by the addition of a prime.

The major difference in the two constructions resides in the fact that sleeve valve 32 is omitted together with its function. Additionally, the interior of piston 23' is chambered and houses a piston 79 slidable along shank 33' and normally held extended to the left against the interior forward end of piston 23' by a calibrated spring 75 and a retainer spider 25a.

The strength of the latter is selected to withstand a desired maximum pressure desired to be developed for system loading purposes by allowing pressurizing action on piston 24 impeded only by the pressure required to cause piston 79 to shift to the right. Upon failure of the front brake sub-assembly spring 75 will cause piston 79 to bottom slowly thereby providing controlled application of the rear brakes. An additional safeguard against excessively harsh braking, acting in concert with spring 75, is provided by the controlled bleeding of fluid from the right hand side of piston 79 through the calibrated orifices 43'. Although piston 79 and spring 75 have been disclosed as located within piston 23' it will be apparent that their pressure limiting function is served equally as well so long as piston 79 is in communication with the forward end of bore 22'.

In the event of rear wheel brake failure, piston 28' shifts forwardly until coming to rest against shoulder 76'. Continued application of pressure to actuator 13' further increases the pressure build up in well 29' and along passage 51' and the front wheel brakes to a moderate safe braking pressure for the front brakes alone. Excessive braking pressure is avoided owing to the bottoming of piston 23' against shoulder 80 interiorly of the head of piston 28'.

In all other respects the two constructions and their operation are substantially identical throughout both as respects normal operation of the master cylinder and as respects fail-safe operation. It will be understood that passages 50' and 51' open into the opposite end of a pressure equalizing chamber constructed in the same manner as described in connection with FIGS. 1 to 6.

While the particular fail-safe vehicle braking system with independent front and rear sub-units herein shown and disclosed in detail is fully capable of attaining the objects and providing the advantages hereinbefore stated, it is to be understood that it is merely illustrative of he presently preferred embodiments of the invention.

I claim:
1. A master cylinder assembly for controlling the fluid pressure in a hydraulic system, said assembly having a main housing slidably supporting a plurality of master piston means of different diameters including means baising each to its retracted position normally, fluid reservoir means in communication with the fluid pressurizing side of each of said master piston means when in their retracted positions, separate fluid passage means opening to the fluid pressurizing side of each of said master piston means, means including actuator means for utilizing a plurality of said master piston means to pressurize fluid as an applicating force is applied thereto whereby to expedite charging and pressurization of a hydraulic system to which said assembly is adapted to be connected, and means responsive to continuing application of force to said actuator means to utilize the applied force on other than the largest diameter one of said master piston means for the purpose of maintaining said separate fluid passage means charged with fluid at progressively higher pressure with slight if any increase in the applied actuator force.

2. A master cylinder assembly as defined in claim 1 characterized in that said separate fluid passage means include means operatively interconnecting the same as respects the pressure conditions in each.

3. A master cylinder assembly as defined in claim 1 characterized in the provision of pressure equalizing means connected between said separate fluid passage means and effective to equalize the pressure in said separate passage means while preventing an exchange of fluid therebetween.

4. A master cylinder assembly as defined in claim 1 characterized in that said plurality of master piston means are slidably supported co-axially of a single cylindrical bore formed in said housing.

5. A master cylinder assembly as defined in claim 1 characterized in that said master piston means are slidably supported axially of one another with the pressurizing sides of certain ones thereof facing in opposite directions.

6. A master cylinder assembly as defined in claim 5 characterized in that the fluid pressurizing chamber for a smaller diameter one of said master piston means is formed within the body of the adjacent larger diameter one of said master piston means.

7. A master cylinder assembly as defined in claim 6 characterized by the provision of valve 32 operable automatically following build-up of fluid pressure on the pressurizing side of a larger diameter one of said master piston means to transfer the pressure load therefrom to a smaller diameter one of said master piston means.

8. A master cylinder assembly as defined in claim 7 characterized in that said valve means for transferring load from a larger to a smaller one of said master piston means includes check valve means operable to release fluid present in the cylinder of the larger master piston means into a non-pressurized chamber of said master cylinder assembly and operable to prevent flow of pressurized fluid from any one of said separate fluid passage means back into the cylinder of said larger diameter master piston means so long as said actuator means is being activated.

9. A master cylinder assembly as defined in claim 8 characterized in that said check valve means includes at least two check valve means one of which is arranged to be opened by operation of said actuator means to release pressurized fluid from the pressurizing side of the large one of said master piston means and the other of which remains closed by pressurized fluid present in said fluid passage means connected thereto.

10. A master cylinder assembly as defined in claim 1 characterized in that all of said master piston means are housed in a single bore in said housing.

11. A master cylinder assembly as defined in claim 10 characterized in that said smaller master piston means is slidably supported in a well opening axially through the fluid pressurizing side of said larger master piston means and wherein said well forms a pressurizing fluid chamber for said smaller master piston means.

12. A master cylinder assembly as defined in claim 6 characterized in that one of said master piston means remains substantially stationary and a second one thereof is formed with an axial well provided with means cooperating with said one master piston means to provide a high pressure cylinder therefor, said actuator means being operable to shift said second master piston means toward the extended position thereof to pressurize fluid forwardly.

13. A master cylinder assembly as defined in claim 12 characterized in that operation of said actuator means is effective to pressurize fluid between the inner end of said single bore and the adjacent end of said one master piston means as well as between the inner end of said axial well and the adjacent end of said second master piston means.

14. A master cylinder assembly as defined in claim 13 characterized in the provision at the inner end of said single bore of a plurality of pressure responsive check valve means including normally closed check valve means opening in response to increasing pressure in the inner end portion of said single bore to release fluid therefrom into one of said separate fluid passage means.

15. A master cylinder assembly as defined in claim 14 characterized in that a second one of said check valve means opens when the pressure in the inner end portion of said single bore drops below the pressure in said one fluid passage means.

16. A master cylinder assembly as defined in claim 15 characterized in that said second check valve means comprises a resilient cup-like member shaped to seat flush against the inner end of said single bore with the outer rim thereof normally resiliently in contact with the sidewall of said bore, and said cuplike member flexing out of contact with the bore wall to permit fluid to flow therepast and back into the bore when the applied force on said actuator means is relieved.

17. A master cylinder assembly as defined in claim 16 characterized in that said one of normally closed check valve means is located centrally of said second check valve means and includes normally flattened tubular passage means formed of resilient material and having its inner end in communication with the inner end of said single bore and being operable to pass pressurized fluid from the inner end portion of said single bore to one of said separate fluid passage means when the fluid pressure in the bore is greater than the pressure in said fluid passage means.

18. A master cylinder assembly as defined in claim 1 characterized in that said master piston means includes means operable automatically after the fluid pressure in said assembly reaches a predetermined pressure to deactivate one of master piston means while maintaining another of said master piston means active and under load.

19. A hydraulic vehicle braking system for front and rear sets of brake-equipped wheels, a master cylinder assembly having fluid-charged conduit means extending to each of said sets of wheels, a plurality of master piston means of different diameters slidably supported in said master cylinder assembly and in communication with a respective supply of hydraulic fluid, common actuator means for said master piston means operable when an applicating force is applied thereto to supply pressurized fluid to the brakes of each of said sets of wheels under pressure developed conjointly by each of said master piston means and including means automatically operable as the force applied to said common actuator means exceeds a predetermined value to continue the supply of pressurized fluid to said sets of brake-equipped wheels by said master cylinder assembly from less than all of said master piston means.

20. A braking system as defined in claim 19 characterized in the provision of a fluid connection between the fluid charged conduit means extending to said set of wheels, and pressure equalizing means in said fluid connection effective to assure substantially the same fluid pressure in all of said conduit means as long as the same remain in a fluid-tight operative condition.

21. A braking system as defined in claim 20 characterized in that said master piston means and said pressure equalizing means are selectively operable to supply pressurized fluid from the fluid pressurizing side of one only of said master piston means in the event of a failure in the braking system for either of said two sets of brake-equipped wheels.

22. A braking system as defined in claim 20 characterized in that said braking system includes fail-safe means automatically responsive to a failure in the fluid system actuating the brakes for either of said two sets of wheels to provide pressurized fluid for the other of said sets of wheels.

23. A braking system as defined in claim 20 characterized in that said braking system includes fail-safe means for selectively supplying high or relatively low pressure fluid to one of said sets of wheels in the event of a failure in the braking system of the other set of wheels depending upon the portion of the system in which a failure occurs.

24. A braking system as defined in claim 20 characterized in that said braking system includes fail-safe means for selectively and automatically utilizing at least one of said master piston means to supply pressurized fluid to said front set of wheels in the event of a failure occurring in the braking system for said rear set of wheels.

25. A braking system as defined in claim 20 characterized in that said braking system includes fail-safe means for selectively and automatically utilizing the larger diameter one of said master piston means to supply pressurized fluid to said rear set of wheels in the event of a failure occurring in the braking system for said front set of wheels.

26. A braking system as defined in claim 20 characterized in that said braking system includes means for venting fluid from the pressurizing side of said smaller diameter master piston means in the event of a failure occurring in the braking system for said front wheels and for utilizing said larger diameter master piston means to supply pressurized fluid to said rear set of wheels thereby to avoid the risk of excessively braking said rear set of wheels.

27. A braking system as defined in claim 19 characterized in the provision of fail-safe means automatically responsive to a pressure failure in the braking system for either of said sets of wheels to deactivate one of said plurality of master piston means and to activate another of said master piston means for use in supplying pressurized fluid to the set of wheels having operative brakes.

28. A braking system as defined in claim 27 characterized in that said pressure responsive means includes fail-safe means operable in response to a pressure failure in the brakes for one of said sets of wheels to change the effective brake operating pressure developed by said master cylinder assembly.

29. A braking system as defined in claim 19 wherein said last mentioned means includes normally closed valve means operatively associated with the larger of said master piston means responsive to the movement of said master piston means toward their respective extended positions to release fluid from the pressurized side of said larger master piston means into a lower pressure chamber thereby to deactivate said larger master piston means while said smaller master piston means remains effective to maintain the brakes pressurized with fluid.

30. A hydraulic braking system for a vehicle having sets of brake-equipped wheels at the opposite ends thereof, a master cylinder assembly having pressurized fluid outlet means operatively connected to each of said braked wheels, a plurality of master piston means movably supported in said master cylinder assembly, a common manually operated actuator means for all of said master piston means effective to activate the same in unison, and means for activating said brakes initially at low pressure and including means for thereafter automatically converting to high pressure actuation as the braking system pressure produced by said actuating means reaches a predetermined value.

31. A braking system as defined in claim 30 characterized in that said master cylinder assembly includes means for changing from low pressure operation to higher pressure operation automatically as an incident to the continued application of force to said common actuator means.

32. A braking system as defined in claim 31 characterized in the provision of fail-safe means responsive to a pressure faliure in certain of the braked wheels to automatically deactivate the supply of pressurized fluid to the failed brakes and to modify the fluid pressure supplied to the operative brakes.

33. A braking system as defined in claim 31 characterized in the provision of fail-safe means therein responsive to unequal fluid pressure conditions in either set of wheels to release fluid from the fluid pressurizing side of one of said master piston means while maintaining fluid on the fluid pressurizing side of another of said master piston means under pressure so long as said common actuator means is being activated.

34. A master cylinder assembly as defined in claim 11 characterized in that the smaller diameter master piston means includes a pair of concentric pistons slidable one on the other within said well.

35. A master cylinder assembly as defined in claim 34 characterized in that the said smaller diameter concentrically arranged master pistons have means including stop means for limiting further relative movement therebetween after the pressure loading thereon exceeds a preselected value whereby both of said smaller pistons move in unison.

36. A braking system as defined in claim 20 characterized in the provision of warning means operatively connected to said pressure equalizing means operable to provide a warning signal to the brake operator when at least the brake shoes of one of said sets of brake-equipped wheels become worn sufficiently to be unsafe.

37. A braking system as defined in claim 24 characterized in that said one master piston means supplying pressurized fluid to said front set of wheels inclues means for limiting the fluid pressure to a safe braking value during operation after failure of the brake for the other set of wheels.

38. A braking system as defined in claim 37 characterized in that said pressure limiting means includes means effective to enlarge the volume of the space occupied by the pressurized fluid to the operative set of brakes as the fluid pressure therein reaches a preselected maximum safe braking pressure.

39. A braking system as defined in claim 19 characterized in the provision of stop means for limiting the movement of said master piston means toward the normal retracted position thereof, a fluid supply reservoir for each of said master piston means, and said stop means being removably supported in a wall of said reservoir and extending into the path of travel of one of said master piston means as the same returns to said normal retracted position.

40. A braking system as defined in claim 39 characterized in that said stop means has a passage therethrough for the flow of fluid between said reservoir and one of said master piston means.

41. A hydraulic braking system for a vehicle having sets of brake-equipped wheels at the opposite ends thereof, a master cylinder assembly having pressurized fluid outlet means operatively connected to each of said braked wheels, a plurality of master piston means movably supported in said master cylinder assembly and so arranged that certain of said master piston means move in opposite directions relative to one another while undergoing activation by said common actuator means, common manually operated actuator means for all of said master piston means effective to activate the same in unison, separate fluid reservoir means in communication with a respective one of said master piston means, and means including said manually operated actuator means for substantially simultaneously interrupting the communication of said separate fluid reservoir means with the associated one of said fluid reservoir means thereby to pressurize trapped fluid forwardly of each of said master pistons and to activate the brakes of each of said sets of brake-equipped wheels generally simultaneously.

42. A braking system as defined in claim 41 characterized in the provision of pressure responsive means operable as the brake system fluid pressure reaches a predetermined value to convert the system pressure from relatively low pressure to a substantially higher fluid pressure without need for applying a correspondingly higher pressure to said common actuator means.

43. A braking system as defined in claim 41 characterized in the provision of means responsive to failure of either one of said sets of brake-equipped wheels to govern the pressure to the set thereof which remains functional at a value appropriate for that particular set of braked wheels and different from the pressure which will be supplied if only the other set of brake-equipped wheels remained operational.

References Cited

UNITED STATES PATENTS

| 1,707,781 | 4/1929 | Blanchard | 60—54.5E |
| 3,172,265 | 3/1965 | Randol | 60—54.6E |
| 3,203,187 | 8/1965 | Randol | 60—54.6E |
| 3,421,321 | 1/1967 | Lewis | 60—54.6E |

MARTIN P. SCHWADRON, Primary Examiner

A. M. ZUPCIC, Assistant Examiner